(12) United States Patent
MacCarthaigh et al.

(10) Patent No.: US 11,411,808 B2
(45) Date of Patent: Aug. 9, 2022

(54) MANAGING FAILOVER REGION AVAILABILITY FOR IMPLEMENTING A FAILOVER SERVICE

(71) Applicant: Amazon Technologies, Inc., Seattle, WA (US)

(72) Inventors: Colm MacCarthaigh, Seattle, WA (US); Nathan Dye, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/833,347

(22) Filed: Mar. 27, 2020

(65) Prior Publication Data
US 2021/0306205 A1 Sep. 30, 2021

(51) Int. Cl.
H04L 41/0668 (2022.01)
H04L 67/10 (2022.01)
G06F 11/20 (2006.01)

(52) U.S. Cl.
CPC ...... *H04L 41/0668* (2013.01); *G06F 11/2025* (2013.01); *G06F 11/2028* (2013.01); *G06F 11/2033* (2013.01); *H04L 67/10* (2013.01)

(58) Field of Classification Search
CPC .............. G06F 11/202; G06F 11/2023; G06F 11/2025; G06F 11/2028; G06F 11/203; G06F 11/2033; G06F 11/2035; G06F 11/2041; G06F 11/3442; H04L 41/0668; H04L 41/0663; H04L 67/1008; H04L 67/1034; H04L 69/40
See application file for complete search history.

(56) References Cited

U.S. PATENT DOCUMENTS 6,865,591 B1   3/2005  Garg
8,595,547 B1  11/2013  Sivasubramanian
8,918,673 B1 * 12/2014  Rangaiah ............ G06F 11/2028
                                                      714/4.11

(Continued)

FOREIGN PATENT DOCUMENTS

WO   WO 2021/108452   6/2021
WO   WO 2021/195392   9/2021

OTHER PUBLICATIONS

Zhou et al., "Cloud Service Reliability Enhancement via Virtual Machine Placement Optimization", 2017, IEEE Transactions on Services Computing, pp. 902-913 (Year: 2017).*

(Continued)

*Primary Examiner* — Gabriel Chu
(74) *Attorney, Agent, or Firm* — Knobbe, Martens, Olson & Bear, LLP

(57) ABSTRACT

The present disclosure generally relates to managing a failover service for regions in an active-active configuration. The failover service can receive a list of regions and a list of rules that must be satisfied for a region to be considered available for failover. For each primary region of a plurality of primary regions, the failover service can then determine the regions that satisfy each rule of the list of rules and are available for failover. The failover service can then deliver this information to a client. The failover service can determine the regions that do not satisfy one or more of the rules from the list of rules and deliver this information to a client. The failover service can perform automatic remediation and client remediation to the unavailable failover regions.

25 Claims, 6 Drawing Sheets

(56) References Cited

U.S. PATENT DOCUMENTS

| | | | |
|---|---|---|---|
| 9,116,862 B1 | 8/2015 | Rath | |
| 9,274,903 B1 | 3/2016 | Garlapati | |
| 9,984,140 B1 | 5/2018 | Sukumaran | |
| 10,404,613 B1 | 9/2019 | Brooker | |
| 10,713,129 B1* | 7/2020 | Tummala | G06F 11/1458 |
| 2005/0193227 A1* | 9/2005 | Nakahara | G06F 11/3452 714/4.1 |
| 2005/0283658 A1 | 12/2005 | Clark | |
| 2006/0047776 A1* | 3/2006 | Chieng | G06F 11/2048 709/217 |
| 2007/0006015 A1 | 1/2007 | Rao | |
| 2007/0180314 A1* | 8/2007 | Kawashima | G06F 11/3433 714/15 |
| 2008/0294933 A1* | 11/2008 | Nishii | G06F 11/2025 714/5.11 |
| 2009/0228589 A1* | 9/2009 | Korupolu | H04L 67/1002 709/226 |
| 2009/0290483 A1 | 11/2009 | Curtis | |
| 2010/0325473 A1* | 12/2010 | Agneeswaran | G06F 11/2041 714/4.1 |
| 2011/0099146 A1 | 4/2011 | McAlister | |
| 2011/0145243 A1 | 6/2011 | Yudenfriend | |
| 2011/0239215 A1* | 9/2011 | Sugai | G06F 9/5088 718/1 |
| 2014/0059379 A1* | 2/2014 | Ren | G06F 11/2069 714/15 |
| 2014/0317441 A1* | 10/2014 | Arata | G06F 11/2025 714/4.12 |
| 2015/0178137 A1* | 6/2015 | Gordon | H04L 67/1008 709/226 |
| 2016/0004552 A1* | 1/2016 | Innan | H04L 67/1008 718/1 |
| 2018/0004612 A1 | 1/2018 | Gahlot | |
| 2018/0143885 A1 | 5/2018 | Dong | |
| 2018/0165166 A1* | 6/2018 | Wang | G06F 11/203 |
| 2019/0235979 A1 | 8/2019 | Li | |
| 2019/0250849 A1 | 8/2019 | Compton | |
| 2019/0281014 A1 | 9/2019 | Lin | |
| 2019/0324874 A1* | 10/2019 | Gill | G06F 9/45558 |
| 2020/0042410 A1 | 2/2020 | Gupta | |
| 2020/0104222 A1* | 4/2020 | Ramamoorthi | G06F 11/00 |
| 2020/0257704 A1 | 8/2020 | Du | |
| 2020/0319890 A1* | 10/2020 | Compton | G06F 11/1471 |
| 2021/0004275 A1 | 1/2021 | Avagyan | |
| 2021/0157692 A1 | 5/2021 | MacCarthaigh | |
| 2021/0157693 A1 | 5/2021 | Waters | |
| 2021/0157694 A1 | 5/2021 | Dye | |
| 2021/0303422 A1 | 9/2021 | Dye | |
| 2021/0303423 A1 | 9/2021 | MacCarthaigh | |

OTHER PUBLICATIONS

Zhou, et al., "Cloud Service Reliability Enhancement via Virtual Machine Placement Optimization," 2017, IEEE Transactions on Services Computing, pp. 902-913.

Search Report and Written Opinion dated Jul. 16, 2021, issued in PCT/US2021/024173.

Search Report and Written Opnion dated Jun. 1, 2021 issued in PCT/US2020/062090.

* cited by examiner

MANAGING FAILOVER REGION AVAILABILITY FOR IMPLEMENTING A FAILOVER SERVICE

BACKGROUND

Network-based computing, in general, is an approach to providing access to information technology resources through services, such as Web services, where the hardware and/or software used to support those services is dynamically scalable to meet the needs of the services at any given time. In network-based computing, elasticity refers to network-delivered computing resources that can be scaled up and down by a network service provider to adapt to changing requirements of users. For example, the elasticity of these resources can be in terms of processing power, storage, bandwidth, and so forth. Elastic computing resources may be delivered automatically and on-demand, dynamically adapting to the changes in resource requirements on or within a given user's system. For example, a client can use a network service to host a large online streaming service, set up with elastic resources so that the number of webservers streaming content to users scale up to meet bandwidth requirements during peak viewing hours, and then scale back down when system usage is lighter.

A client typically will rent, lease, or otherwise pay for access to the elastic resources accessed through network service, and thus does not have to purchase and maintain the hardware and/or software that provide access to these resources. This provides a number of benefits, including allowing users to quickly reconfigure their available computing resources in response to changing demands of their enterprise and enabling the network service provider to automatically scale provided computing service resources based on usage, traffic, or other operational requirements. This dynamic nature of network service computing services, in contrast to a relatively static infrastructure of on-premises computing environments, requires a system architecture that can reliably re-allocate its hardware according to the changing needs of its client base and demands on the network-based computing services.

In network-based computing, locations in which applications may be hosted and/or partitioned may be described as regions and/or availability zones. Each region comprises a separate geographic area from other regions and includes multiple, isolated availability zones. Each region may be isolated from all other regions in the network-based computing system. An availability zone is an isolated location inside a region. Each region is made up of several availability zones that each belong to a single region. Also, each availability zone is isolated, but the availability zones in a particular region are connected through low-latency links. When an application is distributed across multiple availability zones, instances may be launched in different availability zones to enable your application to maintain operation if one of the instances fails (for example, by allowing another instance in another availability zone to handle requests for the application).

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
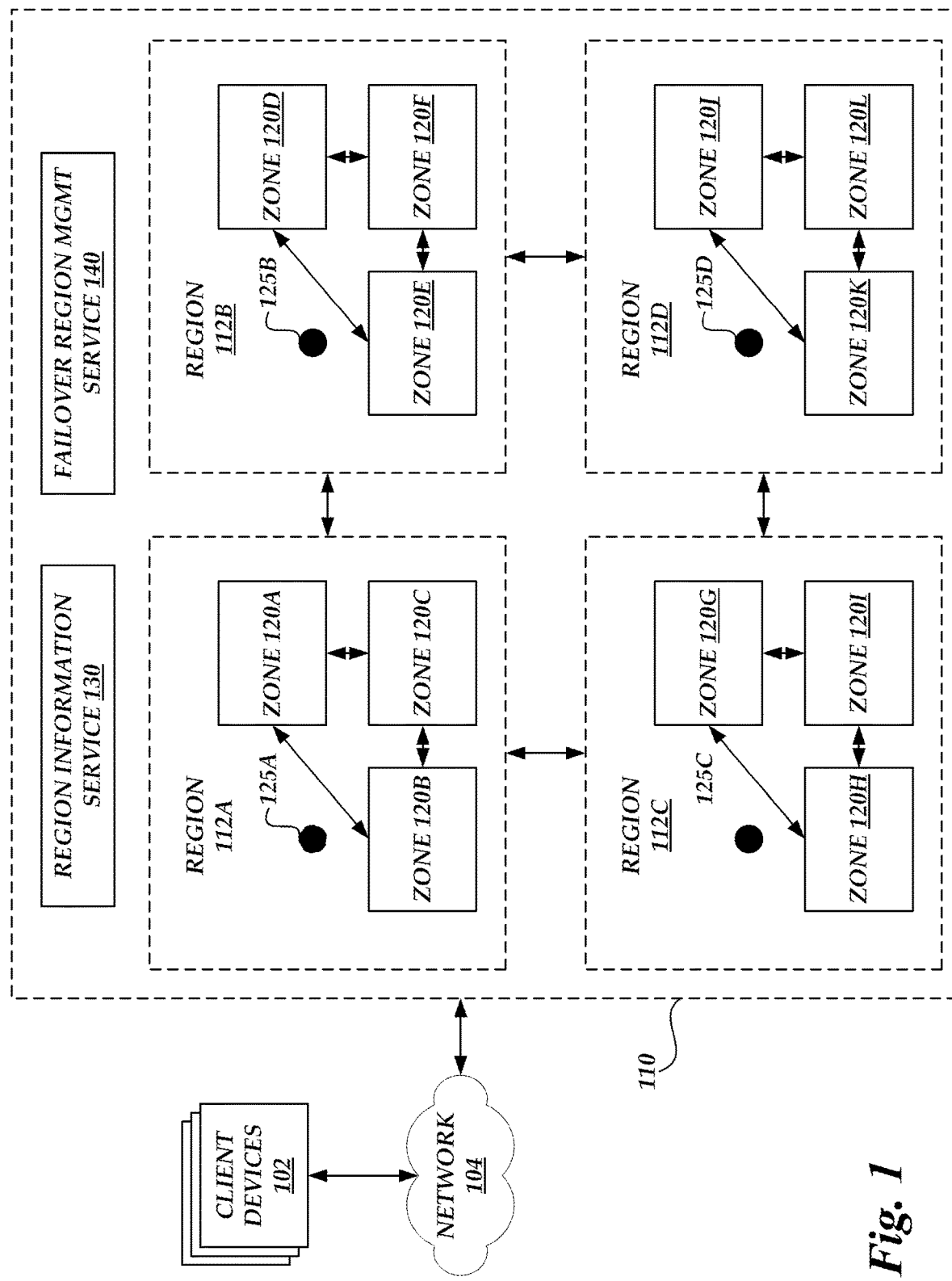
FIG. 1 depicts a schematic diagram of a network service provider in which various embodiments according to the present disclosure can be implemented.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Generally described, aspects of the present disclosure relate to the management of network-based failover services in a network-based computing system. In the network-based computing system, customers can design applications that are partitioned across various isolated computing systems (referred to as "availability zones" or regions). When partitioned as such, each of the various zones or regions hosts a partition of the applications identical to the other partitions of the applications.

In the unlikely event that one of the zones or regions fails, the partitions of the applications hosted by the other zones or regions provide redundancy or failover, allowing the applications to continue running based on the resources in the other zones or regions. More specifically, aspects of the present disclosure relate to providing network-based failover services that enable predictable, controlled, and reliable failover. The network-based failover services facilitate the management of one or more failover regions to be available or primed in the event of a failure of a current or designated region. The network-based failover services can identify target failover regions and utilize processing rules to determine which target failover regions can be characterized as "available" for failover based on information such as capacity, readiness, and the like. The processing rules may be based on capacity of a failover region, data lag, location of a failover region, latency of a failover region, etc. For example, the processing rules may include a processing rule that requires a failover region to be located within a certain distance of a primary region. Further, the processing rules may include a processing rule that requires a failover region to be configured with sufficient data processing speed. The processing rules may further include processing rules directed to one or more operations of a failover region or a primary region. Still further, for target failover regions that have been characterized as "unavailable" or have not been otherwise characterized as "available," the network-based failover services can further implement remediation processes to modify or supplement.

The remediation process can illustratively be implementing manually or automatically and can be customized to allow for one or more failover regions to achieve a characterization of available. When such a failure of one application partition does not obstruct operation of the application in other partitions, or negatively impact the data integrity of data associated with the application (i.e., when a failover workflow ensure that network requests, etc., are appropriate transitioned or directed to a backup partition), the application is said to be highly available because the partitions enable the application to be available more often than not.

Existing mechanisms for managing failovers are overly complicated, significantly increase design work required by customers, and lack features that provide the customer visibility and control over the mechanisms. The present disclosure addresses such problems by providing a system for managing network-based failover services (sometimes referred to as "failover services") that better coordinates failover workflow design and execution while maintaining data integrity of the data associated with the application partitions to enable highly available applications. The system for managing failover services described herein supports a wide range of failover use cases. For example, the failover services support use cases where a primary application partition is running on customer (or other) premises with disaster recovery (DR) set up in the cloud, use cases where the primary application partition is running in the cloud with DR set up on premises, as well as use cases where both the primary application partition and DR are set up in the cloud or on premises.

The network-based failover services of the present disclosure improve upon the faults of the existing mechanisms in various ways. The system for managing failover services of the present disclosure enables customers to manually remediate unavailable failover regions so that they meet the requirements to be considered available in the event of a failover. As described above, some embodiments, the network-based failover service automatically remediates failovers based upon certain readiness requirements set by a client. The system for managing failover services informs a client of the available failover regions, which can be specifically identified or characterized based upon custom rules provided by the user. In some embodiments, the list of rules may be based at least in part upon state information derived from a primary or default region. By way of illustrative example, one rule of the list of rules may correspond to matching or exceeding number of partitions hosted by the primary region. Accordingly, the network-based system would identify target failover regions meeting established partition threshold, identify target failover regions not meeting the established partition threshold and remediate one or more target threshold regions by increasing the number of partitions. Additional details regarding each of these benefits are provided below.

These and other aspects of the disclosure will now be described with regard to certain examples and embodiments, which are intended to illustrate but not limit the disclosure. Although the examples and embodiments described herein will focus on, for the purpose of illustration, specific calculations and algorithms, one of skill in the art will appreciate the examples are illustrative only, and are not intended to be limiting.

FIG. 1 depicts an example computing environment 100 in which a network service provider 110 provides network-based services to client devices 102 via a network 104. As used herein, a network service provider 110 implements network-based services 110 (sometimes referred to simply as a "network-based services 110" or a "services 110") and refers to a large, shared pool of network-accessible computing resources (such as compute, storage, or networking resources, applications, or services), which may be virtualized or bare-metal. The network service provider 110 can provide convenient, on-demand network access to the shared pool of configurable computing resources that can be programmatically provisioned and released in response to customer commands. These resources can be dynamically provisioned and reconfigured to adjust to variable load. The concept of "cloud computing" or "network-based computing" can thus be considered as both the applications delivered as services over the network 104 and the hardware and software in the network service provider 110 that provide those services.

As shown in FIG. 1, the network service provider 110 is illustratively divided into a number of regions 112A-D. Each region 112 may be geographically isolated from other regions 112. For example, region 112A may be geographically located on the U.S. east coast, region 112B may be geographically located on the U.S. west coast, region 112C may be geographically located in Europe, region 112D may be geographically located in Asia, etc. While four regions 112 are shown in FIG. 1, a network service provider 110 may include any number of regions. Each region 112 is illustratively in communication via a network, which may be a private network of the system 110 (e.g., privately owned circuits, leased lines, etc.) or a public network (e.g., the Internet).

In FIG. 1, each region 112 is further shown as divided into a number of zones 120 (across all regions 112, zones 120A-L), which may also be referred to as availability zones or availability regions. Each zone 120 illustratively represents a computing system that is isolated from the systems of other zones 120 in a manner that reduces a likelihood that wide-scale events, such as natural or man-made disasters, impact operation of all (or any two) zones 120 in a region. For example, the computing resources of each zone 120 may be physically isolated by being spread throughout the region 112 at distances selected to reduce a likelihood of a wide-scale event affecting performance of all (or any two) zones 120. Further, the computing resources of each zone 120 may be associated with independent electric power, and thus be electrically isolated from resources of other zones 120 (though the resources may still communicate with one another via a network, which may involve transmission of electrical signals for communication rather than power), independent cooling systems, independent intra-zone networking resources, etc. In some instances, zones 120 may be further isolated by limiting operation of computing resources between zones 120. For example, virtual machine instances in a zone 120 may be limited to using storage resources, processing resources, and communication links in that zone 120. Restricting inter-zone cloud or network-based computing operations may limit the "blast radius" of any failure within a single zone 120, decreasing the chances that such a failure inhibits operation of other zones 120. Illustratively, services provided by the network service provider 110 may generally be replicated within zones 120, such that a client device 102 can (if they so choose) utilize the network service provider 110 entirely (or almost entirely) by interaction with a single zone 120.

As shown in FIG. 1, each zone 120 is in communication with other zones 120 via the communication links. Preferably, the communication links between the zones 120 represent high speed, private networks. For example, zones 120 may be interconnected via private fiber optic lines (or other communication links). In one embodiment, the communication links between zones 120 are dedicated entirely or partially to inter-zone communication, and are separated from other communication links of the zone(s). For example, each zone 120 may have one or more fiber optic connections to each other zone, and one or more separate connections to other regions 112 and/or the network 104.

Each zone 120 within each region 112 is illustratively connected to the network 104. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. While the system 110 is shown in FIG. 1 as having a single connection to the network 104, multiple connections may exist in various implementations. For example, each zone 120 may have one or more connections to the network 104 distinct from other zones 120 (e.g., one or more links to an Internet exchange point interconnecting different autonomous systems on the Internet).

Each region 112A-112D includes an endpoint 125A-125D, respectively. The endpoints 125A-125D may comprise computing devices or systems through which the customer's application can access the network-based services 110. Information provided to one of the endpoints 125 may be propagated to all other endpoints 125. Each region 112 may include more than one endpoint 125 or each region 112 may not include even one endpoint 125.

With continued reference to FIG. 1, the network service provider 110 further includes a region information processing service 130 and a failover region management service 140. As will be described in greater detail below, the region information processing service 130 can be configured to determine a target set of regions that can be designated as a set of primary regions and one or more target failover region for each primary region of the set of primary regions for an individual customer or set of customers. For example, the region information processing service 130 can process customer specific criteria to determine which regions will be designated as primary regions. The region information processing service 130 can further select target failover regions based on selection criteria unique to each primary region based on selection criteria that are applicable to each of the primary regions as described herein. The failover region management service 140 can be configured to receive the target set of failover regions and characterize the availability of at least some portion of the one or more target failover regions based on application of one or more processing rules for each primary region of the set of primary regions. Illustratively, individual processing rules can correspond to an identification of a parameter and one or more thresholds associated with the identified parameter. The parameters correspond to resources configurations or performance metrics that define the ability for a target region to be considered an available failover region. The processing rules may be configured by a customer, the network service provider, or a third party. Additionally, the processing rules may be derived, in part, on the attributes or parameters of the designated primary region (e.g., matching the current attributes of a designated primary region). The failover region management service 140 can further implement a processing engine that can implement processes responsive to a determined list of available or unavailable failover regions. The processing engine can illustratively implement one or more remediation processes that can attempt to modify or supplement target regions that were not determined as available based on the previous application of the processing rules. The processing engine can further implement readiness processes that can be utilized to determine whether the previously determined available failover regions are operationally ready or operable to function in a failover capacity. The results of the failover processes (e.g., remediation or readiness processing) can be utilized to modify or update the list of available failover regions for each of the primary regions.

Client computing devices 102 can include any network-equipped computing device, for example desktop computers, laptops, smartphones, tablets, e-readers, gaming consoles, and the like. Users can access the network service provider 110 via the network 104 to view or manage their data and computing resources, as well as to use websites and/or applications hosted by the network service provider 110. For example, users may access an application having a partition hosted by a zone 120A in the region 112A (for example, a primary) and a zone 120L in the region 112D (for example, a secondary partition).

In accordance with embodiments of the present disclosure, the application having partitions hosted in different zones may be able to withstand a failure in one of the zones 120 or regions 112 in which one of the partitions is operating. For example, if the primary partition hosted in zone 120A experiences a failure, any requests that would normally be handled by the primary partition in the zone 120A may be instead routed to and handled by the secondary partition running in the zone 120L. Such a failure may result in a failover scenario, where operations of the primary partition are transferred to the secondary partition for handling. Failover scenarios may involve manual actions by the customer associated with the application to request routing of communications and so forth from the primary partition to the secondary partition. However, embodiments of the present disclosure can also provide a highly available, managed failover service for applications having partitions hosted in different zones that enables the customer's application to withstand zone or region failures with reduced or minimal interaction from the customer during a failover scenario while maintaining data integrity during such failures and failovers.

Figure 2:
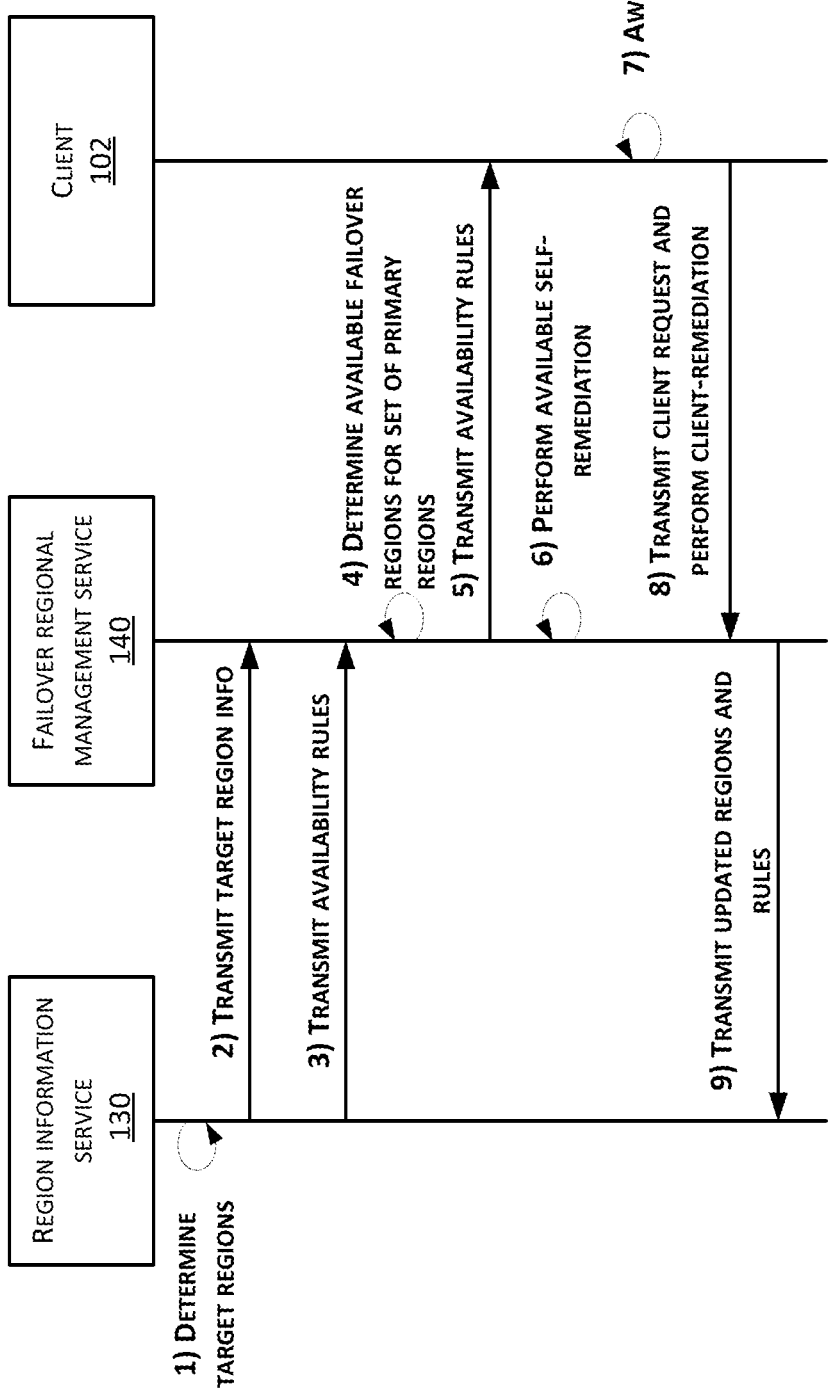
FIG. 2 depicts an example workflow of interactions that manage the availability of a failover service.

FIG. 2 depicts an example workflow 200 of interactions the region information processing service 130, the failover region management service 140 and a client device 102 to determine and manage failover region availability in accordance with an illustrative embodiment. As illustrated in FIG. 2, at (1), the region information processing service 130 determines one or more primary regions and a target set of failover regions for each of the one or more primary regions. The region information processing service 130 may include components for determining the one or more primary regions, the list of target failover regions and a list of processing rules. In one embodiment, the region information processing service 130 may generate or obtain the list of regions based on geographic or network proximity, e.g., regions within a defined radius. For example, the region information processing service 130 may be configured to provide the list of regions located within 500 miles of a designated location or set of locations. In some implementations, the region information processing service 130 may be configured to provide the list of regions located within the same country as the user. In some implementations, region information processing service 130 update the list of rules, the list of failover regions, and the designation of the one or more primary regions periodically. For example, the region information processing service 130 may update every hour. In some implementations, the region information processing service 130 may update when instructed to update by a client. In some implementations, the region information processing service 130 may update periodically and update when instructed to update by the client.

In another embodiment, the region information processing service 130 may also determine or identify the one or more primary regions or target set of failover regions for each primary region based on application of selection criteria related to attributes or characteristics of the regions. For example, the region information processing service 130 may identify or select the region hosting the greatest number of partitions as a primary region. Further, as an example, the region information processing service 130 may identify or select the regions hosting the five greatest number of partitions as primary regions. The region information processing service 130 can further identify one or more additional regions as having the minimum number of partitions to function as potential failover regions. Illustratively, the minimum number of partitions for selection as a failover region does not have to correspond to a desired number of partitions as the failover region management service 140 may remediate a target region to increase the number of partitions. In other examples, the region information processing service 130 can also consider network capacity in terms of measured network traffic or executed instructions/processes, measured load or utilization rate availability rates, error rates, attributed financial cost, infrastructure, workload locality, and the like in selecting the target set of failover regions. Illustratively, the client 102 may select any parameter related to determination of the target set of regions. The network service provider 110 may also specify one or more parameters, such as a minimum list of requirements. For example, the network service provider 110 may specify minimum requirements in terms of capacity and measured load to select primary regions or target failover regions.

At (2), the region information processing service 130 transmits the list of regions to the failover region management service 140. At (3), the region information processing service 130 transmits a set of availability processing rules that allow the failover region management service 140 to determine or characterize availability of the target set of failover regions for each of the primary regions. As described above, individual processing rule can include an identification of one or more parameters (or combination of parameters) and a corresponding one or more thresholds that characterize the availability of an individual target region for a corresponding primary region. Illustratively, the same parameter and threshold may determine whether region is either available or unavailable (e.g., a region matching or exceeding the threshold). In other embodiments, the processing rule can include a first parameter threshold for determining availability and a second parameter threshold for determining unavailability. In this embodiment, having different parameters can be utilized in conjunction with the region selection criteria previously processed by the region information processing service 130 or the remediation processes implemented by the failover region management service 140. For example, if the region information processing service 130 does not filter out any regions, a second threshold parameter may be set to filter out any regions that have no ability to be remediated by the failover region management service 140.

At (4), the failover region management service 140 determines the number of available failover regions for each primary region and transmitting these regions to the client 102 at (5). For example, failover region A may be designated as an available failover region for primary region A and failover region B may be designated as an available failover region for primary region B. In one embodiment, one or more failover regions may be designated as an available failover region for one or more primary regions. For example, failover region A may be designated as an available failover region for primary regions A, B, and C. As described above, the failover region management service 140 can apply the processing rules to the target set of failover regions to identify a set of available failover regions, a set of unavailable regions or combinations/subsets thereof for each of the primary regions. The failover region management service 140 may be configured to optimize the designations of one or more failover regions for multiple primary regions. For example, the failover region management service 140 may be configured to designate a failover region as available for a first primary region and unavailable for a second primary region based on certain optimization criteria including the latency of each region, the distance between the regions, etc. The failover region management service 140 may be configured to designate one failover region as available for failover for multiple primary regions and, after failover for one primary region, designate the failover region as unavailable for other primary regions. In determining, the number of available failover regions for each primary region, the failover region management service 140 may consider the available failover regions for each other primary region and optimize the number of available failover regions for a given primary region. The failover region management service 140 may determine an optimal number of failover regions to be designated as available for a primary region. For example, the failover region management service 140 may determine that each primary region should be provided two failover regions available for failover. In other implementations, the optimal number of failover regions may be any other number.

At (6), the failover region management service 140 can implement one or more additional processes responsive to the determined availability or unavailability of a set of regions. Such responsive processes can include self-remediation in which the failover region management service 140 automatically attempts to configure one or more regions that have been characterized as unavailable in a manner to allow the characterized regions to be subsequently characterized as available. In some embodiments, the self-remediation may include remediating a capacity issue of a failover region. For example, the self-remediation may include increasing the capacity of a region, wherein the capacity is increased such that if an event occurs, the region is primed such that they are available for failover. In some embodiments, the self-remediation may include remediating a configuration of a failover region. For example, the self-remediation may include changing the configuration of one or more regions such that they are available for failover. The automatic or self-remediation may be limited or configured by the failover region management service 140 according to client procedures/limits, such as defining cost limits or the extent of allowable changes. In other embodiments, as described herein, the failover region management service 140 can also conduct readiness checks to verify that target failover regions are currently running and able to function as failover regions. In one embodiment, the one or more additional processes may correspond to providing at least one failover region for every primary region.

At (7), the failover region management service 140 may await a client response from the client 102. The client 102 may be provided a list of available failover regions and a list of unavailable failover regions for each of the primary regions. The client 102 may be provided with an interface of selecting one or more unavailable failover regions to be remediated so that the one or more unavailable failover regions become one or more available failover regions. For example, as further seen in FIG. 3, the client 102 may be provided with a client interface detailing the available failover regions and the unavailable regions. In other embodiments, the client 102 may also specify priority information that facilitates a determination of which potential unavailable region to remediate.

Illustratively, at (8), the client 102 transmits a client response to the failover region management service 140. The failover region management service 140 may be configured to perform the specified remediation corresponding to the client response. The client response may include any set of instructions related to the status of the one or more regions. In some embodiments, the client response may provide one or more regions for remediation, such that the one or more regions satisfy each rule of the list of rules. In some embodiments, the client response may include modifications to the list of rules, wherein the client 102 provides one or more rules to be included in the list of rules.

At (9), the failover region management service 140 can transmit an updated list of available failover regions or other configuration information to the region information processing service 130 for the corresponding primary region. The updated list of failover regions can include updates based on successful remediation or passage/failure of the readiness test. The failover regional management system 106 may be configured to update the list of available failover regions and provide this information to the region information system 102. The failover regional management system 106 may also be configured to update the list of rules based on the client response in (7). The failover regional management 106 may then be configured to provide the updated list of rules to the region information system 102. The region information system 102 may then store the updated list of available regions and the updated list of rules. The process of FIG. 2 may be configured to repeat for every primary region of the one or more primary regions.

Figure 3:
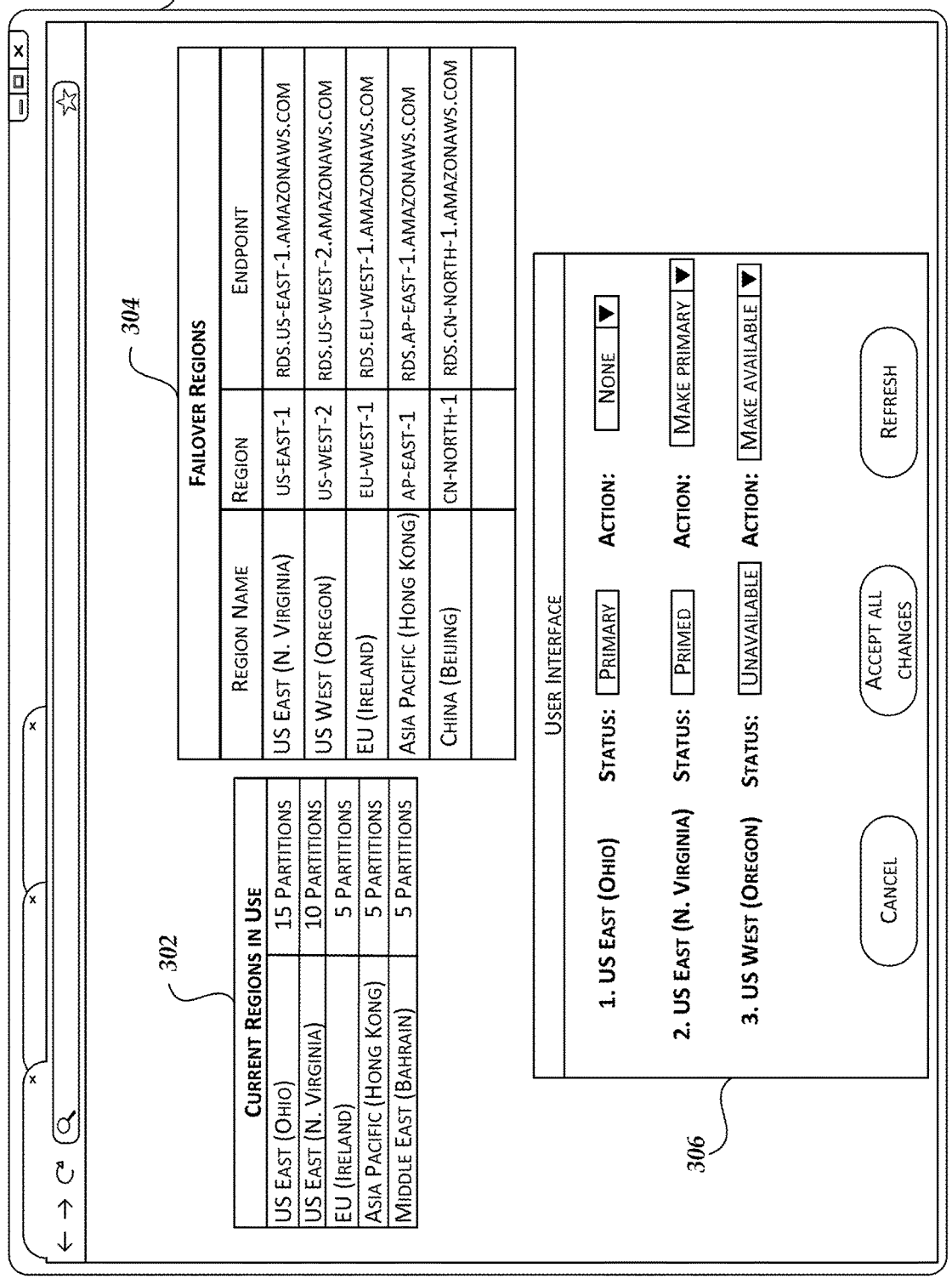
FIG. 3 depicts an example client interface that allows a client to select how the failover service is managed.

FIG. 3 depicts an example client interface 300 for managing a failover service. The client interface 300 may enable the customers whose applications are hosted by a network service provider 110 to create dependency trees and failover workflows for their applications. The dependency trees may map and track upstream and downstream dependencies for the customer's applications to determine the steps to take in a failover to ensure data integrity between the application partitions and the continued availability of the application. Furthermore, the failover service may map the upstream and/or downstream dependencies of sub-applications of the customer applications. Based on the mapped partitions and dependencies, the failover service may coordinate partition or node failover in a sequential manner for any of the individual applications. In some embodiments, the dependencies may comprise other applications or services that provide data and requests.

In some embodiments, the interface 300 is also used to identify failover workflows to be triggered based on the failover states and/or other conditions. The dependency trees and the workflows may be created when the customer designs and creates the application or after the application is created and partitioned. Such dependency trees and failover workflows may enable the failover service to provide visibility into particular dependencies for the application. For example, enabling the customer to see its application's upstream and downstream dependencies, the customer may better understand what sequence of steps or actions are needed during a failover of an application partition or node to ensure availability of the application and data integrity for associated data and can generate the failover workflow accordingly. Thus, the customer may be able to more easily generate a workflow comprising the sequence of steps or actions needed when a failover occurs as opposed to when the dependency tree is not available.

In some embodiments, such failover workflows may be manually triggered by the customer or automatically triggered by the failover service based on the failover states of application partitions or nodes. By tracking the application dependencies and corresponding workflows, the failover service may enable customers to orchestrate failover procedures for applications in a safe, reliable, and predictable manner that maintains data integrity and application availability.

In some embodiments, the customer models their application and/or cells of their application using the failover service. The cells, as used herein, may represent partitions, nodes, or any unit of the application that could be a point of or experience a failure. The customer can use the models of the failover service to define the sequence of steps needed during the failover across one or more applications based on the dependency trees and the like. For example, if the customer detects a failure in the primary partition of the application, the customer can trigger an autoscaling step to scale applications in the secondary partition, after which the customer can trigger a traffic management service to redirect client traffic to the secondary partition. Such controls enable the customer to manage distributed, multi-tier applications in a controlled, reliable, and predictable manner. In some embodiments, the traffic management service may route traffic to an optimal application endpoint based on various parameters relating to performance of the application. In some embodiments, the customer can generate the workflow to include the actions identified above in the event the failure is triggered such that the actions are performed automatically by the failover service.

Similarly, the failover service may provide such controls to the customer to configure workflows (for example, including traffic routing actions using the traffic management service and/or a Domain Name System (DNS) service) implemented based on state changes for application partitions or nodes. In some embodiments, the customer may also configure metadata with state changes for application partitions or nodes. For example, the application partition or node state change may trigger a failover or changing of endpoint or traffic weights per zone or region for the traffic management service and/or the DNS service (also referred to herein as the routing service), which may enable automation of failover workflows and/or sequences of steps.

As described herein, the failover service for the customer application may enable the customer to generate the failover workflow for the application that identifies one or more actions or steps to be taken should the primary partition of the application experience a failure. Thus, as described above, the failover workflow may include steps to take to ensure continued operation of the application and maintained data integrity through individual partition failures. For example, the workflow may include identification of the secondary partition that is a backup to the primary partition (for example, becomes a new primary partition) when a previous primary partition experiences a failure. The failover workflow may also define the state to which the primary partition transitions when it experiences a failure. Though reference herein is made to primary and secondary partitions, the failover services and the failover workflow may apply equally to primary and second nodes.

The client interface 300 may include a first client interface 302 for representing the current regions being used by the client's application. The first client interface 302 may include the names of the regions that are currently being used the client's application. The first client interface 302 may also include the number of partitions currently being implemented in a certain region. The first client interface 302 may contain other information related to the one or more regions that are being actively used at one moment in time by the client. The first client interface 302 may be specific to one primary region of the client. In another embodiment, the first client interface may correspond to multiple primary regions of the clients.

The client interface 300 may include a second client interface 304 for representing failover regions that are available to the user corresponding to the primary region as detailed in the first client interface. The second client interface 304 may provide information to the client related to the failover region for the corresponding primary region. For example, the second client interface 304 may provide the name of the region or the zone, the location of the region or zone, and the endpoint. Further, the second client interface 304 may be configured to provide information related to the failure rate, downtime, or any other factor of a region that may be used in selecting a region for failover.

The client interface 300 may include a third client interface 306 for representing a client input, wherein a client may select one or more options to be performed by the client interface 300. The third client interface 306 may first include a designation of the primary region currently being configured. In another embodiment, the third client interface may include a designation of each of the primary regions corresponding to the client. The third client interface 306 may select regions to be designated as the primary regions based at least in part on the regions hosting the largest number of partitions related to this application. In some embodiments, the primary regions may be selected on other factors including a designation by the client. For example, the client may be provided with an application to select a number of regions to be selected as the primary regions. In some configurations, the client may update the primary regions periodically. The third client interface 306 may include a designation of one or more regions as available failover regions corresponding to the respective primary region. In one embodiment, the available failover regions may correspond to available failover regions for each of the primary regions. The available failover regions may correspond to one or more regions that satisfy each rule of the list of rules. The available regions may further correspond to a list of regions that have previously been designated as available. The third client interface 306 may be configured to periodically update the list of available failover regions and the corresponding primary region. For example, the third client interface 306 may be configured to update the available failover regions and the primary region every hour. Further, the third client interface 306 may be configured to update the available failover regions and the primary region based upon an input provided by the client. For example, the client may direct the third client interface 306 to update the available failover regions based upon the client pressing the refresh button located in the third client interface 306.

The third client interface 306 may include a designation of one or more regions as unavailable failover regions. The unavailable failover regions or zones may correspond to one or more regions or zones that do not satisfy at least one of the availability rules from the list of rules. The unavailable failover regions may further correspond to a list of regions that have previously been designated as unavailable. The third client interface 306 may include information detailing why one or more regions are unavailable failover regions. The third client interface 306 may include a description of the one or more unavailable failover regions. The third client interface 306 may include a description of the remediation steps that could be taken to remediate one or more unavailable failover regions. The third client interface 306 may be configured to periodically update the list of unavailable failover regions. For example, the third client interface 306 may be configured to update the unavailable failover regions every hour. Further, the third client interface 306 may be configured to update the unavailable failover regions based upon an input provided by the client. For example, the client may direct the third client interface 306 to update the unavailable failover regions based upon the client pressing the refresh button located in the third client interface 306.

The third client interface 306 may include an action list for each region corresponding to the respective primary region of the client. Each region corresponding to the client may include one or more regions that are within a radius of the client or of the corresponding primary region. Each primary region corresponding to the client may correspond to one or more regions that the client has preselected for possible failover. The action list may include a list of actions that the third client interface 306 may cause to be performed on the corresponding region. A possible action may be to a make a region the primary region. The third client interface 306 may be directed to cause a region to be labeled as the primary region based upon a client input. Further, a possible action may be to make a previously unavailable failover region an available failover region. For example, the third client interface 306 may detect that a primary region is hosting 15 partitions and a first region can only host 10 partitions. The third client interface 306 may then determine that the first region is an unavailable failover region because it cannot satisfy the capacity requirements of the primary region. The third client interface 206 may, upon an input by a client, make the first region an available failover region by increasing the capacity of the first region to 15 partitions or above. The third client interface 306 may include other options for client communication including but not limited to a "cancel" button and an "accept all changes" button.

In some implementations, the client interface 300 may include one or more other client interfaces for representing more information pertaining to the regions hosting a client's applications. The client interface 300 may include a fourth client interface that represents the applications that are currently being hosted. The fourth client interface may include information about the number of regions hosting each application. The fourth client interface may include information about the status of each application. The client interface 300 may include a fifth client interface that represents the one or more clusters that are associated with the client. The client interface 300 may further include a sixth client interface that represents the primary regions associated with the client.

Figure 4:
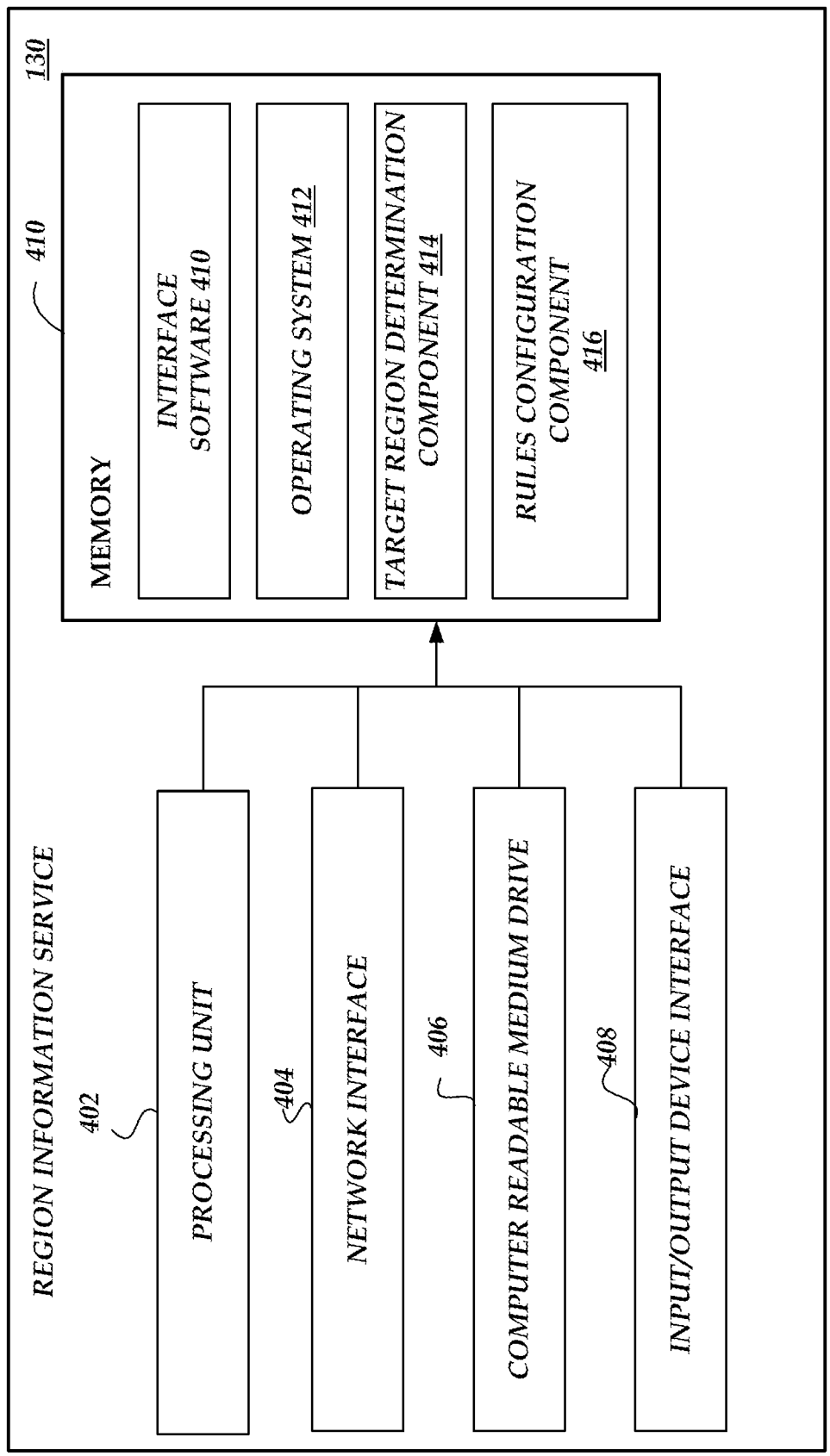
FIG. 4 depicts an example schematic diagram that implements a regional information processing service in accordance with illustrative aspects of the present disclosure.

FIG. 4 depicts a general architecture of a computing device configured to perform the regional information processing service 130, according to some embodiments. The general architecture of the region information processing service 130 depicted in FIG. 4 includes an arrangement of computer hardware and software that may be used to implement aspects of the present disclosure. The hardware may be implemented on physical electronic devices, as discussed in greater detail below. The region information processing service 130 may include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIG. 1.

As illustrated, the region information processing service 130 includes a processing unit 402, a network interface 404, a computer readable medium drive 406, and an input/output device interface 408, all of which may communicate with one another by way of a communication bus. The network interface 404 may provide connectivity to one or more networks or computing systems. The processing unit 402 may thus receive information and instructions from other computing systems or services via the network. The processing unit 402 may also communicate to and from memory 410 and further provide output information for an optional display via the input/output device interface 408. The input/output device interface 408 may also accept input from an optional input device (not shown).

The memory 410 can contain computer program instructions (grouped as units in some embodiments) that the processing unit 402 executes in order to implement one or more aspects of the present disclosure. The memory 410 corresponds to one or more tiers of memory devices, including (but not limited to) RAM, 4D XPOINT memory, flash memory, magnetic storage, and the like.

The memory 410 may store an operating system 414 that provides computer program instructions for use by the processing unit 402 in the general administration and operation of the failover service. The memory 410 may further include computer program instructions and other information for implementing aspects of the present disclosure. For example, in one embodiment, the memory 410 includes a user interface unit 412 that generates user interfaces (and/or instructions therefor) for display upon a computing device, e.g., via a navigation and/or browsing interface such as a browser or application installed on the computing device. In addition to and/or in combination with the user interface unit 412, the memory 410 may further include a target region determination component 416 configured to detect and generate the list of regions and the list of rules. The memory 410 may also include a rules configuration component 418 to manage the implementation of availability rules.

Figure 5:
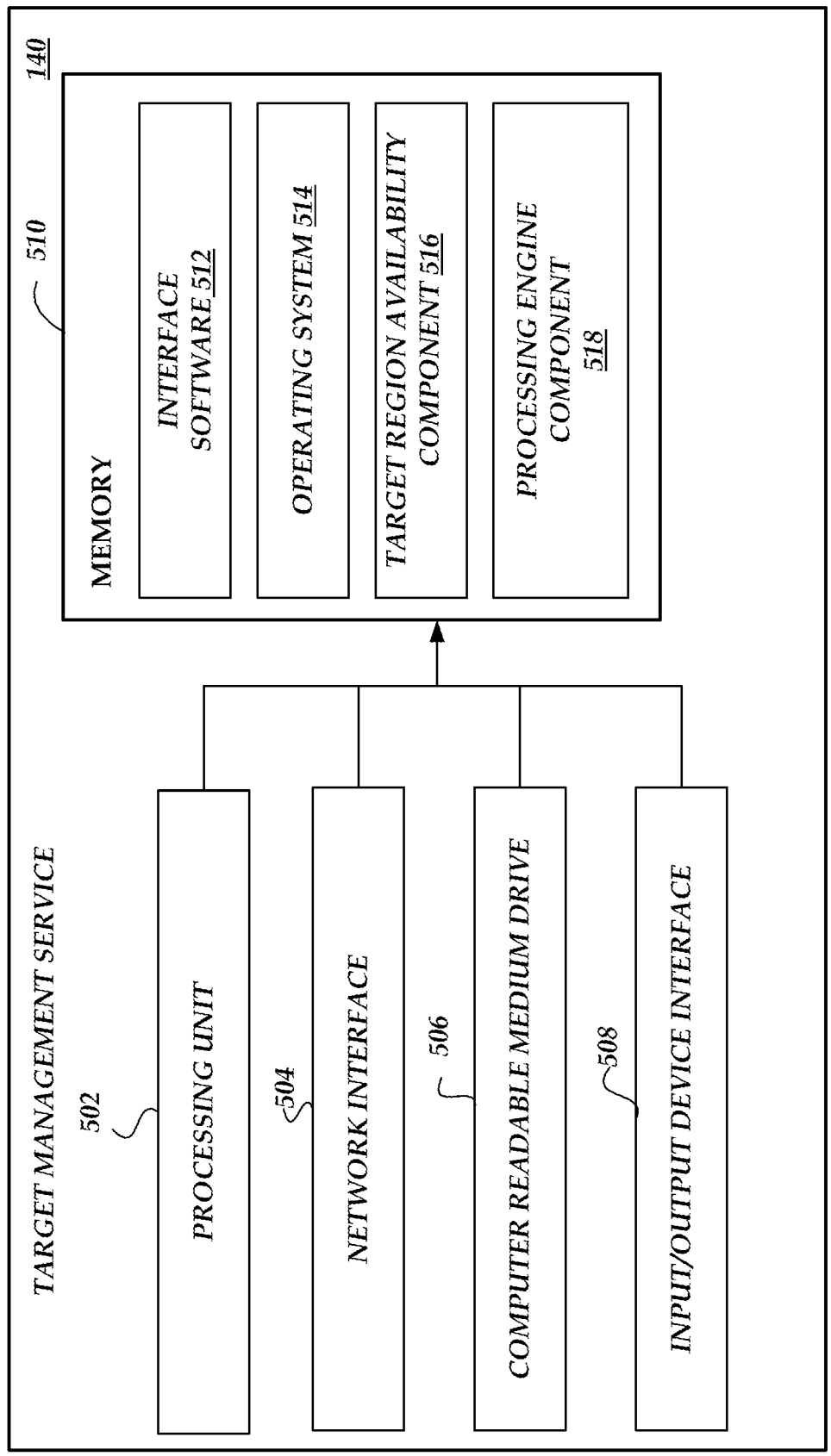
FIG. 5 depicts an example schematic diagram that implements the failover management service in accordance with illustrative aspects of the present disclosure.

FIG. 5 depicts a general architecture of a computing device configured to perform the failover region management service 140, according to some embodiments. The general architecture of the failover region management service 140 depicted in FIG. 5 includes an arrangement of computer hardware and software that may be used to implement aspects of the present disclosure. The hardware may be implemented on physical electronic devices, as discussed in greater detail below. The failover region management service 140 may include many more (or fewer) elements than those shown in FIG. 5. It is not necessary, however, that all of these generally conventional elements be shown in order to provide an enabling disclosure. Additionally, the general architecture illustrated in FIG. 5 may be used to implement one or more of the other components illustrated in FIG. 1.

As illustrated, the failover region management service 140 includes a processing unit 502, a network interface 504, a computer readable medium drive 506, and an input/output device interface 508, all of which may communicate with one another by way of a communication bus. The network interface 504 may provide connectivity to one or more networks or computing systems. The processing unit 502 may thus receive information and instructions from other computing systems or services via the network. The processing unit 502 may also communicate to and from memory 510 and further provide output information for an optional display via the input/output device interface 508. The input/output device interface 508 may also accept input from an optional input device (not shown).

The memory 510 can contain computer program instructions (grouped as units in some embodiments) that the processing unit 502 executes in order to implement one or more aspects of the present disclosure. The memory 510 corresponds to one or more tiers of memory devices, including (but not limited to) RAM, 3D XPOINT memory, flash memory, magnetic storage, and the like.

The memory 510 may store an operating system 514 that provides computer program instructions for use by the processing unit 502 in the general administration and operation of the failover service. The memory 510 may further include computer program instructions and other information for implementing aspects of the present disclosure. For example, in one embodiment, the memory 510 includes a user interface unit 512 that generates user interfaces (and/or instructions therefor) for display upon a computing device, e.g., via a navigation and/or browsing interface such as a browser or application installed on the computing device. In addition to and/or in combination with the user interface unit 512, the memory 510 may further include a target region availability determination component 516 configured to detect and generate the list of regions and the list of rules. The memory 510 may also include a failover region processing engine component 518 to manage the implementation of processes, such as remediation or readiness processing.

Figure 6:
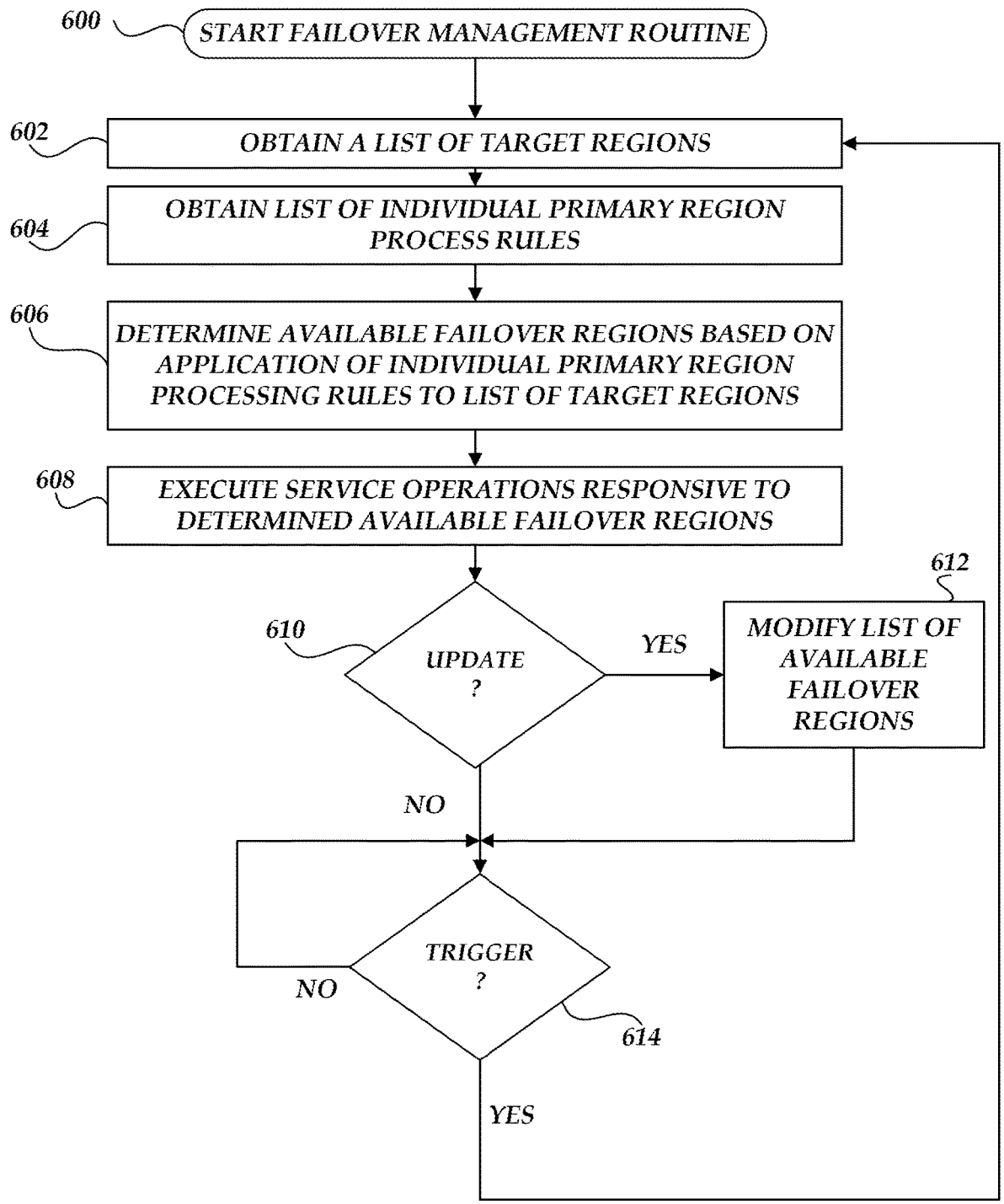
FIG. 6 is a flow diagram illustrative of a failover management routine implemented by a failover service in accordance with illustrative aspects of the present disclosure.

FIG. 6 is a flow diagram depicting an example routine 600 for managing a failover service. The routine 600 may be carried out by the failover region management service 140, for example. The routine 600 may be carried out for each primary region of a list of primary regions. In one implementation, the list of primary regions may correspond to a group of regions hosting client partitions in an active-active configuration.

The routine 600 begins at block 602, where the failover region management service 140 obtains a list of failover regions. The list of failover regions may contain one or more failover regions. The list of failover regions may correspond to regions previously designated as available failover regions. The list of failover regions may correspond to all or a portion of all of the regions within a certain area. For example, the list of failover regions may correspond to regions located within a certain distance of the primary region. The list of failover regions may be provided by a client for input into the failover service. The list of failover regions may be detected by examining each region that is running a client's partitions. In some implementations, the list of failover regions may include regions that are not currently running any of the client's partitions. In some implementations, the list of failover regions may be unique to each primary region. In other implementations, two or more primary regions may correspond to the same failover region(s) or the same list of failover regions.

The routine 600 then continues at block 604, where the failover region management service 140 obtains a list of rules. The list of rules 306 may contain one or more rules where the one or more rules may be related to one or more region parameters. The list of rules 306 may correspond to rules that must be satisfied for a region to be considered available as a failover region for the respective primary region. The list of rules 306 may be provided in whole or in part by a client. The list of rules 306 may be provided in whole or in part based on a determination by the region information system 306. For example, the region information system 306 may determine that the client is running seven primary regions and a first primary region is running 20 partitions. The region information system 306 may then determine that one rule for the first primary region is that region must have a capacity to run 20 partitions to be considered available as a failover region.

The routine 600 continues at block 606, where the region information processing service 130 must obtain the list of available failover regions. The list of available failover regions may contain one or more available failover regions corresponding to the respective primary region. The failover region management service 140 may obtain the list of available failover regions by receiving the list from the client. The failover region management service 140 may obtain the list of available failover regions by listing which regions from the list of regions satisfy each of the rules from the list of rules corresponding to the respective primary region. In some implementations, the failover region management service 140 may obtain the list of available failover regions corresponding to a previous list of available failover regions.

The routine 600 continues at block 608, where the failover region management service 140 must determine the list of unavailable failover regions. The failover region management service 140 may obtain the list of unavailable failover regions by listing which regions from the list of regions do not satisfy one or more of the rules from the list of rules corresponding to the respective primary region. In some implementations, the failover region management service 140 may obtain the list of unavailable failover regions by listing which regions from the list of regions are not on the list of available failover regions. The failover region management service 140 must then determine one or more rule engines configured to operate on the one or more available failover regions. The one or more rule engines may include one or more of a remediation engine and a readiness engine. The remediation engine may be configured to remediate one or more unavailable failover regions such that the one or more unavailable failover regions satisfies each rule of the list of rules. The readiness engine may be configured to ready the failover service such that one or more of the unavailable failover regions is placed into an available position.

At decision block 610, a test is conducted to determine whether to update the list of available regions for the respective region. If so, at block 612, the list of available regions can be updated with the available target failover regions. In one implementation, target failover regions that were previously indicated as unavailable may be indicated as available based on successful remediation. Further, target failover regions that were previously indicated as available may be indicated as unavailable based on the occurrence of an adverse event. For example, the list of updated available regions can be updated to remove previously available target regions that became unavailable and were not successful in the readiness processing. At decision block 614, a test is conducted to determine whether to repeat the routine 600. As described above, the trigger event can correspond to timing information, manual selection or other established event, such as client input event, a decrease in capacity of a primary region, or any other event. In one implementation, the trigger event can correspond to further primary regions in the active-active configuration. In another implementation, the routine 600 can be repeated for each primary region of the list of primary regions. The routine 600 can repeat to block 602.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a similarity detection system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A similarity detection system can be or include a microprocessor, but in the alternative, the similarity detection system can be or include a controller, microcontroller, or state machine, combinations of the same, or the like configured to estimate and communicate prediction information. A similarity detection system can include electrical circuitry configured to process computer-executable instructions. Although described herein primarily with respect to digital technology, a similarity detection system may also include primarily analog components. For example, some or all of the prediction algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a similarity detection system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the similarity detection system such that the similarity detection system can read information from, and write information to, the storage medium. In the alternative, the storage medium can be integral to the similarity detection system. The similarity detection system and the storage medium can reside in an ASIC. The ASIC can reside in a user terminal. In the alternative, the similarity detection system and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for managing failover regions, the system comprising:
    a data storage medium storing region designations; and
    one or more computer hardware processors for managing failover of an application that is partitioned across a plurality of isolated regions, the one or more computer hardware processors in communication with the data storage medium, wherein the one or more computer hardware processors are configured to execute computer-executable instructions to at least:
        obtain a designation of a set of primary regions for the application, wherein individual regions of the primary regions correspond to a particular geographic location for hosting a partition of the application;
        for individual primary regions of the set of primary regions, obtain a list of target failover regions for the application, the list of target failover regions corresponding to failover regions that are in a same or neighboring region as the individual primary region;
        obtain a plurality of individual primary region processing rules, wherein individual primary regions of the set of primary regions correspond to one or more processing rules of the plurality of individual primary region processing rules, the individual primary region processing rules associated with capacity information attributed to at least one individual primary region of the set of primary regions;
        process the list of target failover regions to determine a list of available failover regions for individual primary regions of the set of primary regions based on applying a first subset of the plurality of individual primary region processing rules, the list of available failover regions comprising one or more target failover regions associated with capacity information at least one of matching or exceeding the capacity information associated with the at least one individual primary region of the set of primary regions;
        process the list of target failover regions to determine a list of unavailable failover regions for individual primary regions of the set of primary regions based on applying a second subset of the plurality of individual primary region processing rules, the list of unavailable failover regions comprising one or more target failover regions associated with capacity information not exceeding the capacity information associated with the at least one individual primary region of the set of primary regions; and
        perform a remediation operation configured to increase capacity of one or more unavailable failover regions of the list of unavailable failover regions.

2. The system of claim 1, wherein the one or more computer hardware processors are configured to execute further computer-executable instructions to at least:
    perform a test on one or more available failover regions of the list of available failover regions for the individual primary regions to generate a determination of a readiness of a regional failover management system;
    indicate the readiness of the regional failover management system; and
    update the list of available failover regions for the individual primary regions, based at least in part on the readiness of the regional failover management system.

3. The system of claim 1, wherein the one or more computer hardware processors are configured to execute further computer-executable instructions to at least automatically perform the remediation operation to increase capacity of the one or more unavailable failover regions.

4. The system of claim 1, wherein the one or more computer hardware processors are configured to execute further computer-executable instructions to at least:

obtain one or more additional processing rules corresponding to one or more of the primary regions, the one or more additional processing rules defining individual parameters and associated thresholds, wherein processing the list of target failover regions to determine the list of available failover regions for individual primary regions of the set of primary regions is further based on applying the one or more additional processing rules.

5. The system of claim 1, wherein the list of available failover regions further comprises one or more target failover regions associated with capacity information at least one of matching or exceeding capacity information that is associated with two or more primary regions of the set of primary regions.

6. A system for managing failover regions, the system comprising:

a data storage medium storing region designations; and
one or more computer hardware processors for managing failover of an application that is partitioned across a plurality of isolated regions, the one or more computer hardware processors in communication with the data storage medium, wherein the one or more computer hardware processors are configured to execute computer-executable instructions to at least:

for the application, identify a plurality of primary regions and a list of corresponding target failover regions, wherein individual primary regions of the plurality of primary regions respectively correspond to one or more target failover regions of the list of corresponding target failover regions, wherein individual regions of the primary regions and the target failover regions correspond to a particular geographic location for hosting a partition of the application;

obtain a plurality of individual primary region processing rules, wherein individual primary regions of the plurality of primary regions respectively corresponds to one or more processing rules of the plurality of processing rules, the individual one or more processing rules defining at least one associated parameter and threshold associated with characterizing the list of corresponding target failover regions;

process the list of corresponding target failover regions to determine a list of available failover regions for each primary region of the list of primary regions based on an application of one or more individual primary region processing rules to one or more target failovers regions corresponding to the respective primary region; and perform at least one rules engine operation configured to increase capacity of a particular target failover region of the one or more target failover regions for a primary region of the list of primary regions responsive to at least one list of available failover regions.

7. The system of claim 6, wherein the one or more computer hardware processors are configured to execute further computer-executable instructions to at least characterize one or more target failover regions as unavailable with respect to one or more primary regions of the plurality of primary regions based at least in part on application of one or more individual primary region processing rules of the list of processing rules to the list of corresponding target failover regions.

8. The system of claim 6, wherein the one or more computer hardware processors are configured to execute further computer-executable instructions to at least:

characterize a plurality of target failover regions of the list of corresponding target failover regions as unavailable with respect to a first subset of primary regions of the plurality of primary regions based at least in part on application of one or more individual primary region processing rules of the list of processing rules to the list of corresponding target failover regions; and characterize the plurality of target failover regions of the list of corresponding target failover regions as available with respect to a second subset of primary regions of the plurality of primary regions based at least in part on application of one or more individual primary region processing rules of the list of processing rules to the list of corresponding target failover regions.

9. The system of claim 6, wherein the one or more computer hardware processors are configured to execute further computer-executable instructions to at least:

characterize a first plurality of target failover regions of the list of corresponding target failover regions as available with respect to a first subset of the plurality of primary regions based at least in part on application of one or more individual primary region processing rules of the list of processing rules to the list of corresponding target failover regions; and characterize the first plurality of target failover regions of the list of corresponding target failover regions as available with respect to a second subset of the plurality of primary regions based at least in part on application of one or more processing rules of the list of processing rules to the list of corresponding target failover regions.

10. The system of claim 6, wherein to perform the at least one rules engine operation, the one or more computer hardware processors are configured to execute further computer-executable instructions to at least remediate with respect to one or more primary regions of the plurality of primary regions, one or more target failover regions characterized as unavailable.

11. The system of claim 6, wherein to perform the at least one rules engine operation, the one or more computer hardware processors are configured to execute further computer-executable instructions to at least remediate with respect to one or more primary regions of the plurality of primary regions, one or more available failover regions from one or more lists of available failover regions based at least in part on a defined proximity of a failover event.

12. The system of claim 6, wherein to perform the at least one rules engine operation, the one or more computer hardware processors are configured to execute further computer-executable instructions to at least remediate with respect to one or more primary regions of the list of primary regions, one or more available failover regions from one or more lists of available failover regions based at least in part on at least one of a failure rate, cost, availability, workload locality, infrastructure, or latency of the one or more available fail over regions.

13. The system of claim 6, wherein to perform the at least one rules engine operation, the one or more computer hardware processors are configured to execute further computer-executable instructions to at least:

perform a readiness check on one or more available failover regions of one or more lists of available failover regions, with respect to one or more primary regions of the list of primary regions;

provide an indication of a readiness of the one or more available failover regions, with respect to the one or more primary regions; and update the one or more lists of available failover regions based at least in part on the indication of the readiness of the one or more available failover regions, with respect to the one or more primary regions.

14. They system of claim 6, wherein a particular processing rule of the plurality of processing rules corresponds to capacity.

15. They system of claim 6, wherein a particular processing rule of the plurality of processing rules corresponds to error rates.

16. They system of claim 6, wherein a particular processing rule of the plurality of processing rules is generated by the client.

17. A computer-implemented method for managing failover of an application that is partitioned across a plurality of isolated regions, wherein the plurality of isolated regions is comprised of a plurality of primary regions and at least one failover region, the method comprising:

obtaining a list of a plurality of primary regions for the application;

obtaining a list of target failover regions for the application, wherein individual regions of the plurality of primary regions and the target failover regions correspond to a particular geographic location for hosting a partition of the application;

defining a list of available failover regions for individual primary regions of the plurality of primary regions based on the list of target failover regions, wherein the list of available failover regions is based at least in part on application of individual primary region processing rules defining availability metrics to the list of one or more target failover regions, wherein individual primary regions of the plurality of primary regions correspond to one or more processing rules of the plurality of individual primary region processing rules;

determining one or more operations configured to increase capacity of a particular target failover region of the one or more target failover regions for a primary region of the list of primary regions responsive to the list of available failover regions; and performing the one or more operations.

18. The method of claim 17, the method further comprising:

performing a readiness check on the list of available failover regions for individual primary regions of the plurality of primary regions;

providing an indication of a readiness of one or more available failover regions of the list of available failover regions for individual primary regions; and updating the list of available failover regions for individual primary regions based at least in part on the indication of the readiness of the one or more available failover regions.

19. The method of claim 17 further comprising:

defining a list of unavailable failover regions for individual primary regions of the plurality of primary regions based on the list of target failover regions, wherein the list of unavailable failover regions is based at least in part on the application of the individual primary region processing rules to the list of one or more target failover regions;

generating a remediation recommendation based upon defining the list of unavailable failover regions for individual primary regions of the plurality of primary regions; and remediating one or more unavailable failover regions by performing a remediation operation, based at least in part on the remediation recommendation.

20. The method of claim 19, further comprising updating the list of available failover regions for individual primary regions responsive to a successful remediation of the one or more unavailable failover regions.

21. The method of claim 17, wherein the one or more operations configured to increase capacity of the particular target failover region of the one or more target failover regions responsive to the list of available failover regions comprises determining the list of target failover regions correspond to target criteria for the corresponding primary region.

22. The method of claim 17, further comprising:

defining the plurality of primary regions, wherein the plurality of primary regions are regions hosting a largest number of partitions among the plurality of isolated regions; and defining the list of target failover regions, wherein the list of target failover regions are regions hosting a number of partitions lower than the largest number of partitions among the plurality of isolated regions.

23. The method of claim 17, further comprising limiting capacity checks on the list of target failover regions.

24. The method of claim 17, wherein the list of available failover regions identifies a failover region common to two or more primary regions of the plurality of primary regions.

25. The method of claim 17, wherein the list of available failover regions identifies a failover region unique to a primary region of the plurality of primary regions.

* * * * *